No. 703,547. Patented July 1, 1902.
D. S. COOK.
WEIGHING MACHINE.
(Application filed Apr. 23, 1901.)
(No Model.) 2 Sheets—Sheet 1.

ATTEST- INVENTOR-
Harry L. Ames. David S. Cook.
George M. Anderson. By E. W. Anderson,
his Atty.

No. 703,547. Patented July 1, 1902.
D. S. COOK.
WEIGHING MACHINE.
(Application filed Apr. 23, 1901.)
(No Model.) 2 Sheets—Sheet 2.
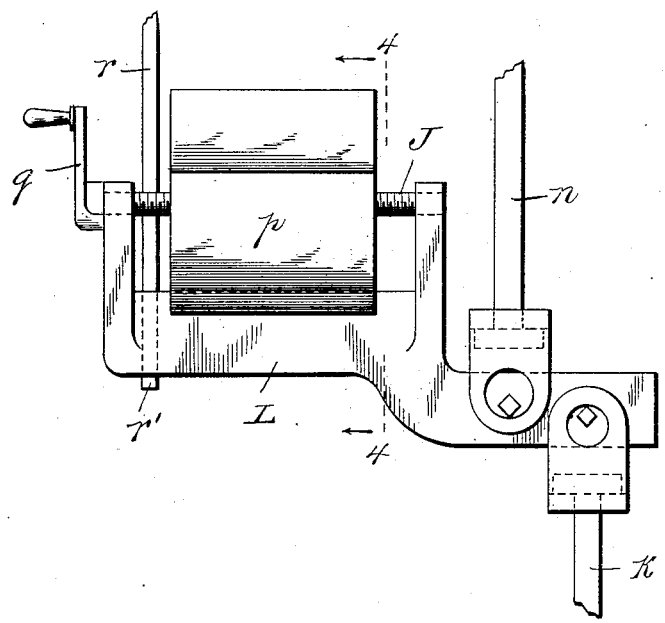
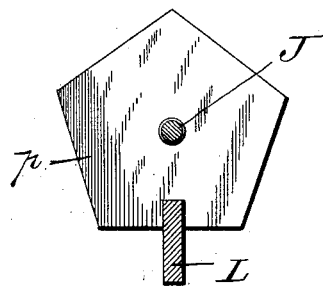
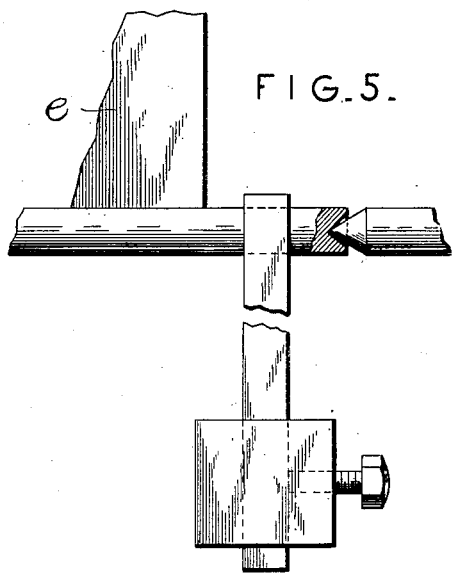
ATTEST-
Harry L. Ames.
George M. Anderson.
INVENTOR-
David S. Cook.
By E.W. Anderson
his atty.

UNITED STATES PATENT OFFICE.

DAVID S. COOK, OF SELLERSBURG, INDIANA.

WEIGHING-MACHINE.

SPECIFICATION forming part of Letters Patent No. 703,547, dated July 1, 1902.

Application filed April 23, 1901. Serial No. 57,075. (No model.)

*To all whom it may concern:*

Be it known that I, DAVID S. COOK, a citizen of the United States, and a resident of Sellersburg, in the county of Clark and State of Indiana, have made a certain new and useful Invention in Weighing-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
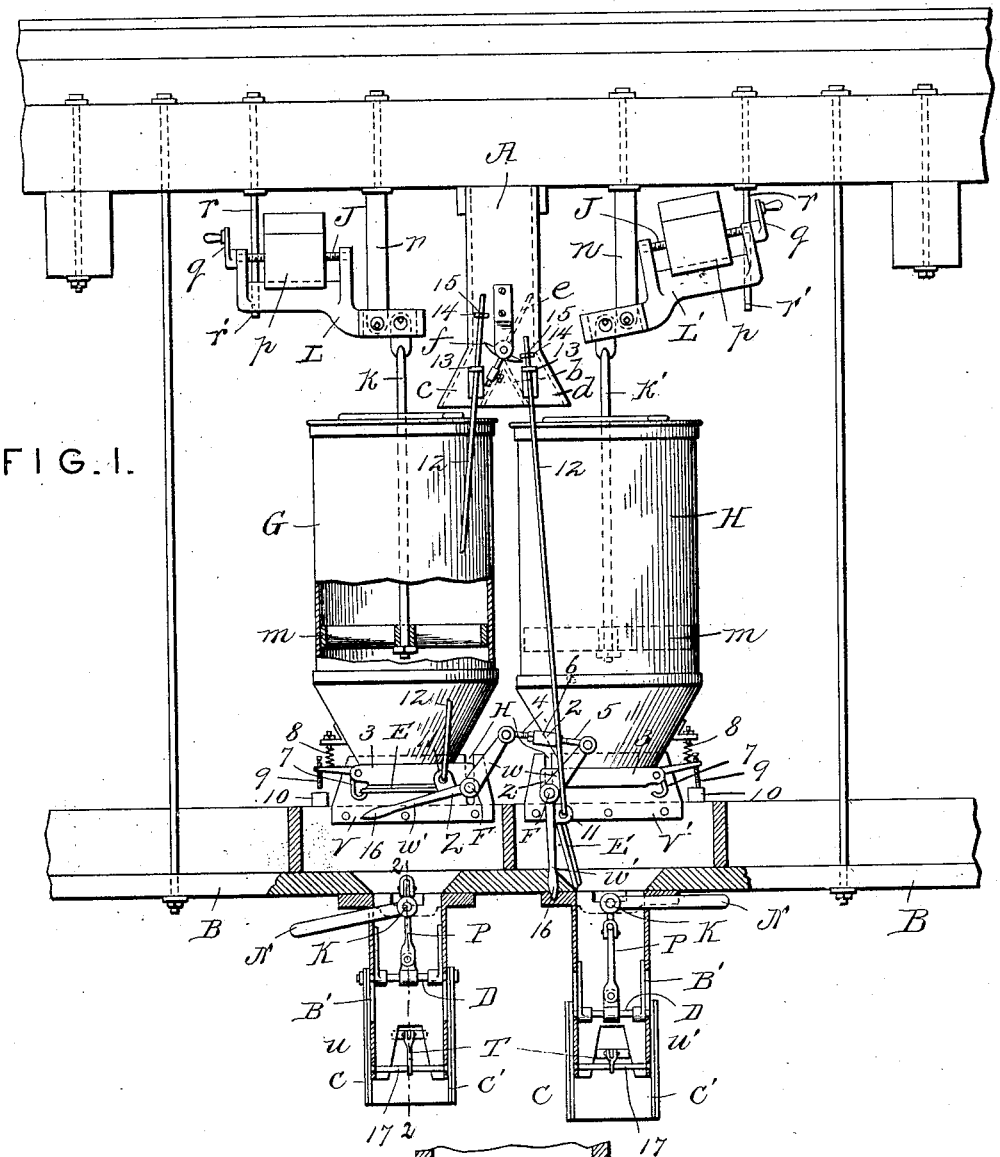
Figure 2:
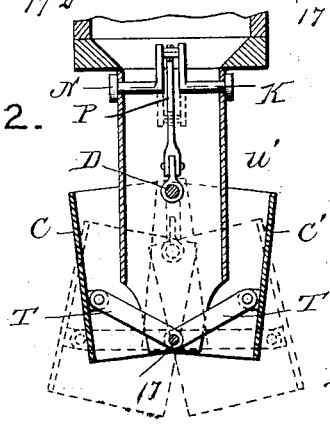

Figure 1 is a side elevation of my weighing-machine, partly in section. Fig. 2 is a section on the line 2 2, Fig. 1. Fig. 3 is a detail view of one of the scale-beams. Fig. 4 is a section on the line 4 4, Fig. 3. Fig. 5 is a detail view of one of the pivots for the gate $e$.

The invention relates to automatic weighing and sacking machines; and it consists in the novel construction and combinations of parts, as hereinafter set forth.

In the accompanying drawings, illustrating this invention, the letter A designates a double-mouth spout leading from the discharge floor or hopper of the mill. At the top of the partition $b$, between the mouths $c$ and $d$ of this spout, is pivoted the inflow-valve $e$, projecting upward and having upon the end of its shaft the cross-arm $f$, such cross-arm being exterior to the spout. Below said spout and arranged side by side under its two mouths in respective relation thereto are the laterally-arranged weigh-boxes, weigh pans or holders G and H, which are independently suspended by rods $k$ $k'$ from the short arms of the balance-levers L L', to which they are pivoted. The lower ends of said rods are connected to cross-bars $m$ in said weigh-boxes. The levers L L' are pivoted to hangers $n$ of the frame, said levers having bearings each for a threaded rod J, on which is an adjustable weight $p$, having a threaded bore which engages the screw J. This screw or threaded bearing-rod is provided with a crank-handle $q$ at one end to facilitate turning it to adjust the weight thereon according to requirement. The weight $p$ is prismatic and cannot turn when the crank is rotated. Under such rotation therefore it moves lengthwise of the crank-screw J. A stirrup $r$ is provided with a check $r'$ to stop the movement of the lever when the weigh-box has risen to its normal position.

It is apparent that if either weigh-box is charged with sufficient cement or flour or other material to overcome the resistance of its weight $p$ such weigh-box will descend slightly toward the lower support or beam B, which carries the sack-holding tubes $u$ $u$. This beam also carries the guides V V', into which the lower or spout ends of the weigh-boxes descend.

Z represents a lever device common to the two weigh-boxes and consisting of the elbow-levers or crank-arms $w$ $w$, having a parallel movement and the intermediate adjustable right and left screw connection $z$. To each elbow-lever is rigidly secured the valve or weighing-gate E. The pivot-shaft F has its bearing in a vertical slot H of the guide V, but is pivoted to a lug 2 of the neck-band 3 of the weigh-box. The connection $z$ consists of the right and left screws 4 and 5 in line with each other and connected by an adjusting-nut 6, having a right and left thread to correspond with such screws. By turning the nut the lever device is adjusted to regulate the relative position of the lever-gates E E.

Each weigh-box is provided at its neck 3 with an angle-catch 7, adapted to engage its lever-gate E when the latter is brought to position. To this end the angle-catch is provided with a spring 8, engaging a crank-arm of said catch and a threaded or adjustable bearing 9, also engaging said crank-arm, the adjustable bearing serving to regulate the opening of said valve upon the descent of the weigh-box. As said weigh-box descends the bearing 9, impinging against a fixed stop or lug 10 of the frame, moves the angle-catch sufficiently to allow the lip of the gate to escape. It thus falls, permitting the discharge of the contents of the weigh-box through the sack-holding spout into the sack.

To a lug 11 of elbow-levers or crank-arms $w'$ $w'$ upon the gate-pivots of the weigh-boxes is connected a rod 12, which extends upward through a bearing 13 of the double spout above the cross-arm $f$ of the valve-shaft. To the end portion of each rod is connected an adjustable catch 14, which is provided with a bearing through which such rod passes, a set-screw 15 serving to secure the adjustment. The levers w' w' are usually provided with handles 16 for use when desirable.

To the lower portions of the sack-holding tubes are connected the pairs of spreading lips C and C'. Each pair of spreading lips is pivoted to the sacking-tube by means of a rod D, which is connected to an arm of angle-lever K by means of a pitman P. The pivot-rod D passes on each side of the sacking-tube through a slot B', so that motion of translation up and down is permitted to said pivot-rod and to the spreading lips connected thereto. To the lower end of each sacking-tube is connected a bar 17, extending transversely and carrying the pivoted spreading-arms T, the outer ends of which are connected to the spreading lips.

When the angle-lever K is turned by means of its handle-arm N from one side to the other, the pitman is forced down, carrying with it the spreading lips, which are at the same time pushed open or apart by the arms T. In this open position they are adapted to hold the sack or bag, the mouth of which is drawn around the tube above such lips. When the sack is filled, the handle N is turned back to the other side of the tube, closing the spreading lips toward each other and permitting the sack to be readily disengaged and dropped from the mouth of the sacking-tube.

The operation is very simple. The weights p, adjustable catches 14, and the stops 9 having been adjusted, the flow of cement or other material is directed, by means of the valve in the double mouth, into one of the weigh-boxes, the gate E of which is closed. When the proper quantity of material has descended into this weigh-box, determined by the position of the weight on its suspending-lever, the weigh-box descends, and its bearing impinging against the stop 10 moves the angle-catch 7 to disengaged position, allowing the gate E to fall and discharge the contents of the weigh-box into the sack attached to the sacking-tube below. This movement, through the action of the compound lever, raises the gate of the opposite weigh-box and closes it, the spring angle-catch securing it automatically as the weigh-box rises clear of the stop 10. At the same time the descent of the gate E of the discharging-box pulls down the rod 12 and its catch 14, which engaging the cross-arm f of the valve in the double spout pulls said valve over to opposite position and directs the flow of material into the closed weigh-box. As soon as the latter is filled the operation is repeated in a reverse manner, so that the weigh-boxes are alternately filled and discharged automatically and continuously.

This weighing-machine is of simple construction and its parts are strong and durable, so that it is not liable to get out of order from clogging or other casualty. The machine is adapted to weigh into sacks or packages of any ordinary size grain, flour, coffee, cement, salt, or other substances of like dry and flouring character.

The weights may be set to allow just so much material to flow into each weigh-box, and the adjusting device is so constructed as to hold the weight securely in position. The laterally-arranged or twin weigh-boxes and the combination therewith of the pair of lever-gates and their connection, forming a mutual compound lever-gate device, are designed to provide a reliable automatic movement.

The scale-beams have their outer arms elevated above the point about which such beams swing, whereby the weight adjustable thereon is materially lessened when the outer arm rises, owing to the fact that the weight upon such outer arm moves horizontally as well as vertically. This effects a quicker operation of the scale-beams and decreases friction upon the scale-beam pivots.

The pivotal edges upon which the weigh-boxes are suspended are each located one-fourth inch above the pivotal edge of such beams, whereby a more direct downward movement of the weigh-box through about one-half of an inch is effected to cause a quicker release of the gate E.

Having described this invention, what I claim, and desire to secure by Letters Patent, is—

1. In a weighing-machine, the weigh-boxes, having the pivoted gates, the crank-arms of the gate-pivots, the rod connecting said arms, the double-mouthed spout having the valve, and means operating in connection with said gates for moving the spout-valve, substantially as specified.

2. In a weighing-machine, the weigh-boxes, having the pivoted gates, the crank-arms of the gate-pivots, the rods connecting said arms, the double-mouthed spout, having the valve provided with the cross-arm upon its pivot, and the reciprocatory rods engaging said cross-arm, and operating in connection with said gates for moving the spout-valve, substantially as specified.

3. In a weighing-machine, the weigh-boxes, the pivoted gates of said boxes, the parallel crank-arms of the gate-pivots, and the rod connecting said crank-arms, and providing for a parallel movement thereof, whereby the gates open and close alternately, substantially as specified.

4. In a weighing-machine, the weigh-boxes, the pivoted gates of said boxes, the crank-arms of the gate-pivots, the rod connecting said arms, the pivoted catches for said gates, having the crank-arms, and the bearing-screws engaging said arms, substantially as specified.

5. In a weighing-machine, the weigh-boxes, having the pivoted gates, the crank-arms upon the gate-pivots, the rod connecting said arms, the pivoted catches for said gates, having the crank-arms, the adjustable bearings carried by said arms, and the springs for maintaining said catches in engagement with said gates, substantially as specified.

6. In a weighing-machine, having the gates, the catches for said gates having the crank-arms, the adjustable bearings carried by said crank-arms, and springs for maintaining said catches in engagement with said gates, substantially as specified.

7. In a weighing-machine, the weigh-boxes, having the pivoted gates, the double cranks upon the pivot of each said gate, the rod connecting one pair of such cranks, the double-mouthed spout having the valve, and means connected with the other pair of said cranks for moving the spout-valve, substantially as specified.

8. In an automatic weighing-machine, the combination with the weigh-boxes, and the lever device common thereto, of the gates, the automatic catches therefor, the double spout and its valve and cross-arm, the adjustable catches, and the rods connecting such catches to said lever device, substantially as specified.

9. In an automatic weighing-machine, the combination with the weighing-gates, and the automatic catches, of the elbow-levers or lever-arms rigidly connected to said gates, the right and left screws connected to said lever-arms, and the right and left threaded nut connecting said screws, substantially as specified.

In testimony whereof I affix my signature in presence of two witnesses.

DAVID S. COOK.

Witnesses:
E. N. WICHT,
A. E. SNODGRASS.